US011500716B2

(12) United States Patent
Lu et al.

(10) Patent No.: US 11,500,716 B2
(45) Date of Patent: Nov. 15, 2022

(54) LOCALLY-MANAGED POE SWITCH AND MANAGEMENT SYSTEM

(71) Applicant: UNIPOE IOT TECHNOLOGY CO., LTD., Dongguan (CN)

(72) Inventors: Xiaoyong Lu, Dongguan (CN); Jindong Bu, Dongguan (CN); Guoshu Wu, Dongguan (CN)

(73) Assignee: UNIPOE IOT TECHNOLOGY CO., LTD., Dongguan (CN)

( * ) Notice: Subject to any disclaimer, the term of this patent is extended or adjusted under 35 U.S.C. 154(b) by 402 days.

(21) Appl. No.: 16/645,794

(22) PCT Filed: Jun. 8, 2017

(86) PCT No.: PCT/CN2017/087520
§ 371 (c)(1),
(2) Date: Mar. 10, 2020

(87) PCT Pub. No.: WO2018/223323
PCT Pub. Date: Dec. 13, 2018

(65) Prior Publication Data
US 2020/0218594 A1    Jul. 9, 2020

(30) Foreign Application Priority Data
Jun. 6, 2017  (CN) .......................... 201710418015.3

(51) Int. Cl.
*G06F 11/07* (2006.01)
*H04L 12/10* (2006.01)
(52) U.S. Cl.
CPC ...... *G06F 11/0793* (2013.01); *G06F 11/0751* (2013.01); *H04L 12/10* (2013.01)

(58) Field of Classification Search
CPC ... G06F 11/0793; G06F 11/0751; H04L 12/10
See application file for complete search history.

(56) References Cited

U.S. PATENT DOCUMENTS

2007/0081553 A1\* 4/2007 Cicchetti ................. H04L 12/10
370/466
2009/0228722 A1\* 9/2009 Lin ........................ H04L 12/10
713/300
(Continued)

FOREIGN PATENT DOCUMENTS

| CN | 203219325 U | 9/2013 |
| CN | 103905211 A | 7/2014 |

(Continued)

*Primary Examiner* — Aurel Prifti
(74) *Attorney, Agent, or Firm* — Bayramoglu Law Offices LLC

(57) ABSTRACT

A local management-based Power Over Ethernet (PoE) switch and a management system. The PoE switch includes a casing, a Liquid Crystal Display (LCD) screen, a monitoring Micro Control Unit (MCU) module, a power system module, a display module, a PoE system module, a switch system module, a key group arranged on the casing, and a key module. The key module transmits information to the MCU module through the display module, and the MCU module connected with the display module, the PoE system module, the switch system module and the key module respectively through a bus performs corresponding operation according to the information. By adoption of the technical solution, working states of the PoE and switch system modules are visually displayed on the screen, and then are correspondingly processed according to the information and displayed on the screen.

3 Claims, 9 Drawing Sheets

(56) References Cited

U.S. PATENT DOCUMENTS

| | | | |
|---|---|---|---|
| 2010/0229048 A1* | 9/2010 | Karam | H04L 41/0681 |
| | | | 714/48 |
| 2010/0231197 A1* | 9/2010 | Jamieson | G01R 15/125 |
| | | | 324/115 |
| 2012/0242702 A1* | 9/2012 | Sirpal | H04M 1/724 |
| | | | 345/649 |
| 2012/0271477 A1* | 10/2012 | Okubo | H04L 12/10 |
| | | | 700/297 |
| 2013/0007474 A1* | 1/2013 | Wilmes | G06F 1/266 |
| | | | 713/300 |
| 2013/0207641 A1* | 8/2013 | Timm | G01R 13/0272 |
| | | | 324/121 R |
| 2014/0245031 A1* | 8/2014 | Hamdi | G06F 1/28 |
| | | | 713/300 |
| 2015/0235543 A1* | 8/2015 | Dietz | H04L 49/40 |
| | | | 340/286.02 |
| 2016/0191314 A1* | 6/2016 | Russell | H04L 41/22 |
| | | | 709/221 |
| 2016/0294567 A1* | 10/2016 | Stewart | H04L 12/10 |
| 2017/0085434 A1* | 3/2017 | Young | H04L 41/22 |
| 2017/0195179 A1* | 7/2017 | Chan | H04L 41/0869 |

FOREIGN PATENT DOCUMENTS

| | | |
|---|---|---|
| CN | 204465583 U | 7/2015 |
| WO | 2016164425 A1 | 10/2016 |

* cited by examiner

LOCALLY-MANAGED POE SWITCH AND MANAGEMENT SYSTEM

CROSS REFERENCES TO THE RELATED APPLICATIONS

This application is the national phase entry of International Application No. PCT/CN2017/087520, filed on Jun. 8, 2017, which is based upon and claims priority to Chinese Patent Application No. 201710418015.3, filed on Jun. 6, 2017, the entire contents of which are incorporated herein by reference.

TECHNICAL FIELD

The present disclosure discloses a visual and self-repairing Power Over Ethernet (PoE) switch, and relates to the technical field of communications, in particular to a PoE switch.

BACKGROUND

At present, switches on the market are mainly classified by management function into two types:

The first type is a management type switch that can be remotely managed in a networking mode. This switch is powerful in management function and can be managed through a WEB page, a serial port and the like, but a computer must be connected to achieve the purpose of management.

The other type is a non-management type switch without a management function, commonly referred to as a "fool" switch. This switch cannot optimize operating parameters according to a use environment, and is prone to soft failures during long-term use.

However, these two types of switches have their own deficiencies specifically as follows:

For the management type switch:

1. The management type switch is powerful in function and flexible in application, but it needs to be configured, so that it is relatively complicated in operation and has relatively high requirements for the skill of an operator.

2. In order to manage the switch, it is usually connected with a Personal Computer (PC) through a serial port, an internet access and the like, and terminal software of the PC is used to set some parameters of a PoE switch.

3. The management type switch is more expensive than the non-management type switch.

For the non-management type switch:

1. When a plant designs a machine, conventional parameters are fixed in the machine, so that the parameters of the machine cannot be optimized and changed according to the use environment.

2. Some switches are arranged on the machine to change certain parameters. However, since the switches occupy the space of a machine panel, only a small number of switches can be arranged in this mode.

SUMMARY

The present disclosure aims to overcome the deficiencies in the prior art. By adding a Liquid Crystal Display (LCD) screen and keys on a panel of a non-management type Power Over Ethernet (PoE) switch as a human-machine interaction interface, the non-management type PoE switch not only has some important functions for on-site management, but also avoids a complicated operation process of a management type PoE switch. Therefore, on-site construction personnel can set different parameters respectively according to the characteristics of terminal equipment connected with a PoE switch. The difficulty of setting and debugging is lowered, and the workload of daily maintenance is reduced. The technical solution of the present disclosure is as follows: A local management-based PoE switch includes a casing 1, an LCD screen 3, a monitoring Micro Control Unit (MCU) module, a power system module, a display module, a PoE system module and a switch system module. The monitoring MCU module is connected with the display module, the PoE system module and the switch system module respectively through a bus. The monitoring MCU module monitors working states of the PoE system module and the switch system module in real time, and displays relevant information through the display module. The local management-based PoE switch further includes a key group 4 and a key module. The key group (4) is arranged on the casing 1, and the monitoring MCU module is connected with the key module through a bus. The key module transmits information to the monitoring MCU module through the display module, and the monitoring MCU module performs corresponding operation according to the received information.

The local management-based PoE switch is characterized in that the key group 4 is arranged around the LCD screen 3.

The local management-based PoE switch is characterized in that the key group 4 includes five keys, namely a menu key, a confirm key, a back key, an up key and a down key.

The local management-based PoE switch is characterized in that the key module is configured to set the switch system module.

An implementation method of a management system of the local management-based PoE switch includes the following steps:

at the step A, after the power system module supplies power to all the modules, enabling the monitoring MCU module to start to work, initializing all the functional modules, and then displaying information of a port;

at the step B, detecting, by the monitoring MCU module, whether feedback information of the key module is received, and processing the feedback information if YES;

at the step C, reading, by the monitoring MCU module, information of the PoE system module, acquiring a state of the port, initializing the PoE system module, simultaneously detecting a power voltage, a temperature of a control chip, and whether the port is connected with a PD, eliminating the abnormality through resetting if the above components have an abnormality, and commanding, by the monitoring MCU module, the display module to display the information of the port after the abnormality is eliminated;

at the step D, detecting, by the monitoring MCU module, the switch system module, detecting whether the broadband of each port has an abnormality, eliminating the abnormality by resetting if the abnormality exists, or directly cutting off the power to the port if the abnormality may not be eliminated; commanding, by the monitoring MCU module, the display module to display the information of each port if no abnormality exists;

at the step E, in the processes of the steps C and D, detecting in real time, by the monitoring MCU module, whether the feedback information of the key module is received, and correspondingly processing the feedback information.

A management system of the local management-based PoE switch is characterized in that information of the key module, which is fed back to the monitoring MCU module, includes switch mode, bandwidth prewarning, PD type, Power Sourcing Equipment (PSE) power fine adjustment, PSE port priority level, PSE port ON/OFF, LCD ON/OFF and fan control.

The management system of the local management-based PoE switch is characterized in that information is selected and information data are confirmed through the key module, and the monitoring MCU module reads the information data through the bus and correspondingly processes the information data.

By the adoption of the above technical solutions, the monitoring MCU module is connected with the PoE system module, the switch system module, the display module and the key module respectively through the bus, and reads the working states of the PoE system module and the switch system module. An MCU microcontroller unit module further analyzes the information, and visually displays the working states of the PoE system module and the switch system module on the LCD screen. Meanwhile, the information provided by the key module is correspondingly processed, and then is displayed on the LCD screen. Construction or maintenance personnel can quickly determine a working condition of a PoE system through the information displayed on the LCD screen, so that the debugging time or maintenance time of equipment is reduced, and the working efficiency is improved.

BRIEF DESCRIPTION OF THE DRAWINGS

FIG. 5 is a show legend of a display screen of Embodiment I;

FIG. 6 is a show legend of a display screen of Embodiment II;

DETAILED DESCRIPTION

The technical solution of a local management-based Power Over Ethernet (PoE) switch of the present disclosure is further described in detail below with reference to the accompanying drawings.

Figure 1:
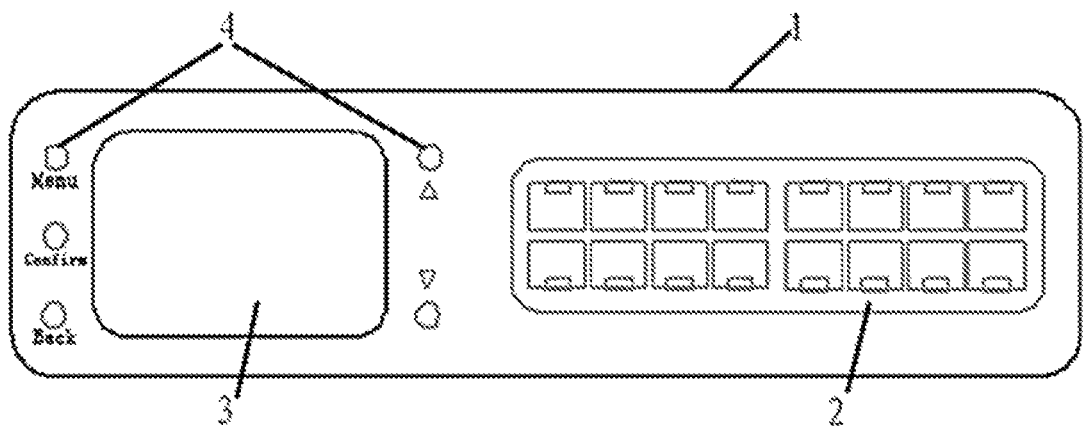
FIG. 1 is an appearance diagram of a local management-based Power Over Ethernet (PoE) switch according to the present disclosure.
Figure 2:
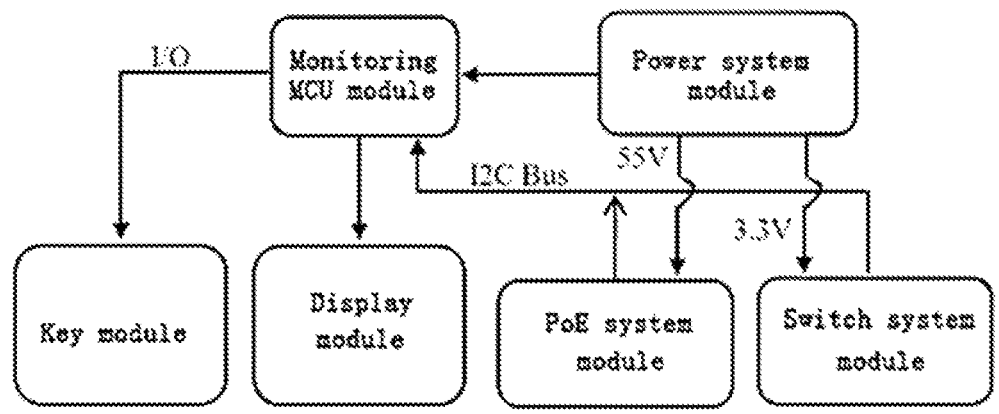
FIG. 2 is a structural block diagram of a local management-based PoE switch according to the present disclosure.

As shown in FIG. 1 and FIG. 2, the local management-based PoE switch includes a monitoring Micro Control Unit (MCU) module, a power system module, a display module, a PoE system module, a switch system module and a key module. The monitoring MCU module is connected with the display module, the PoE system module and the switch system module respectively through a bus. The monitoring MCU module monitors working states of the PoE system module and the switch system module in real time, and displays relevant information through the display module. The monitoring MCU module is connected with the key module through the bus, and the key module transmits information to the monitoring MCU module through the display module. The monitoring MCU module performs corresponding operation according to the received information. A port 2, a Liquid Crystal Display (LCD) screen 3 and a key group 4 are arranged on a casing 1 of the PoE switch. The display module is the LCD screen 3 which is arranged on the casing 1. The key module is the key group 4 which is arranged on the casing 1. The key group 4 is arranged around the LCD screen 3. The key group 4 includes a menu key, an up key, a down key, a confirm key and a back key.

Figure 3:
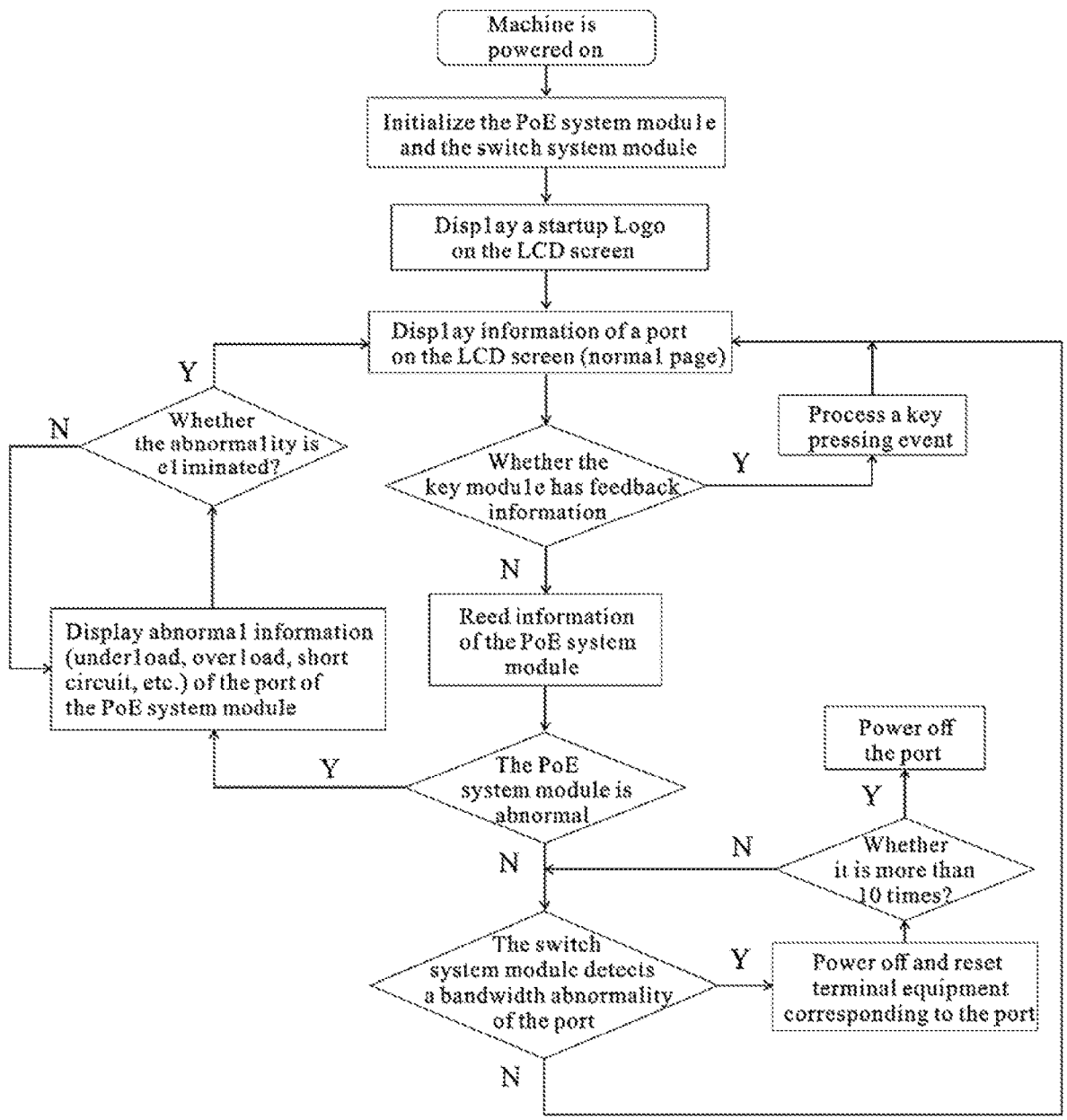
FIG. 3 is a work flowchart of a local management-based PoE switch according to the present disclosure.
Figure 4:
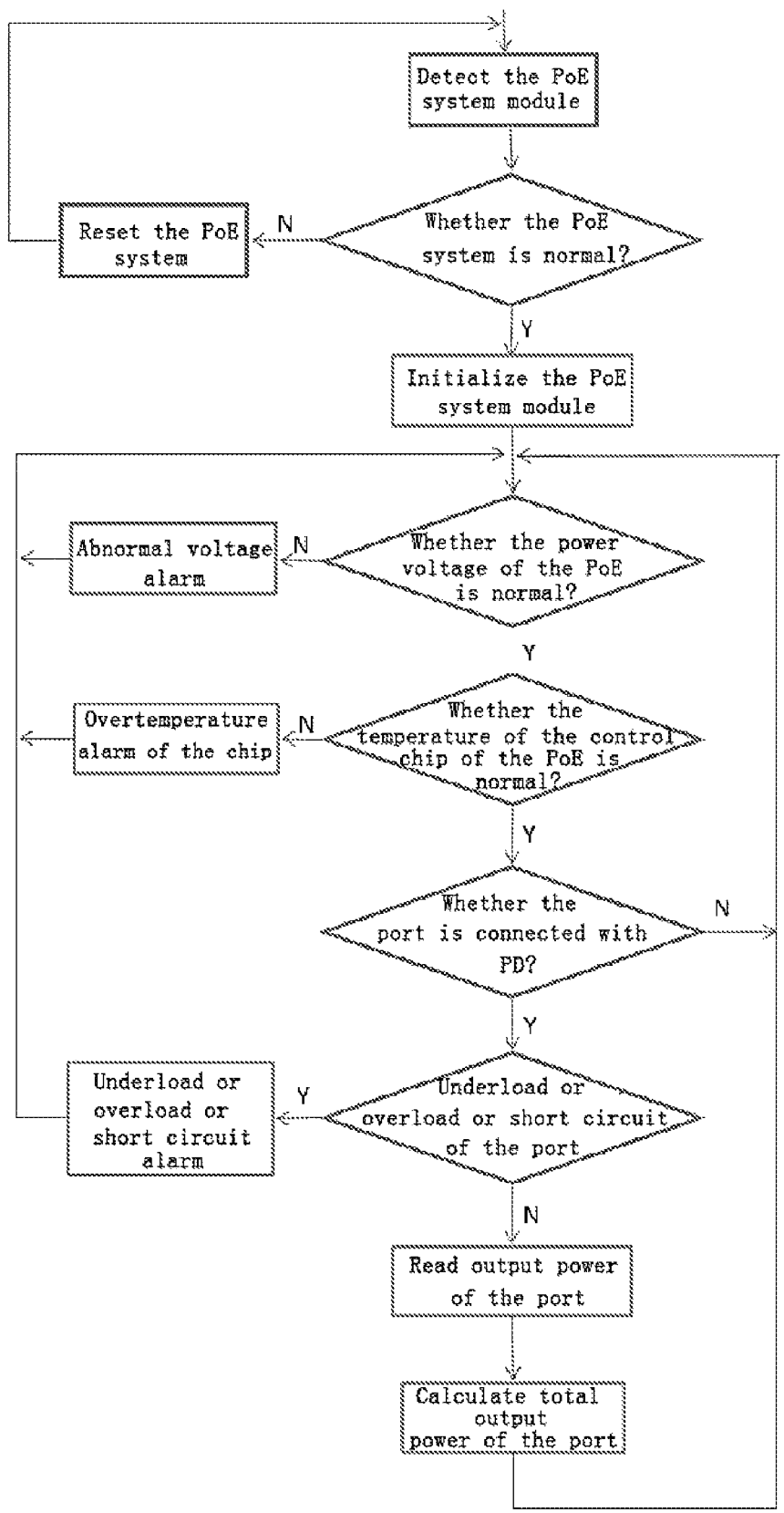
FIG. 4 is a work flowchart of a PoE system module of a local management-based PoE switch according to the present disclosure.

A working process of an implementation method of a management system of a local management-based PoE switch is as shown in FIG. 3 and FIG. 4:

The implementation method of the human-machine interaction function management system of the local management-based PoE switch involves a monitoring Micro Control Unit (MCU), a display module and a key module.

After the power system module supplies power to all the modules, the monitoring MCU module starts to work, and initializes all the functional modules. After the initialization is completed, the display module sends an instruction to a Liquid Crystal Display (LCD) screen to display a company Logo for five seconds and then display information of a port. The monitoring MCU module accesses the key module in real time through an Input/Output (I/O) bus, monitors in real time whether a key instruction is received, processes the key instruction if the key instruction is received, and commands the display module to display an information state of the port after the processing is completed.

If the key instruction is not received, the monitoring MCU module reads information of a PoE system module, acquires a state of the port, detects whether the PoE system module is normal at first, resets the PoE system module if the PoE system module is abnormal, and then continuously detects the PoE system module. If the PoE system module is normal, the monitoring MCU module initializes the PoE system module, then detects whether a power voltage is normal, sounds an alarm if the power voltage is abnormal, and detects and controls the power voltage in real time. If the power voltage is normal, the monitoring MCU module detects whether a temperature of a control chip is normal, sounds an alarm if the temperature of the control chip is abnormal, and detects and controls the temperature of the control chip in real time. After the above work is done, the monitoring MCU module detects whether the port is connected with a PD, detects whether the port has an underload, overload or short circuit phenomenon if the port is connected with the PD, reads output power of the port if the port does not have the underload, overload or short circuit, and displays the output power on the LCD screen and detects in real time the port. If the port has the underload, overload or short circuit phenomenon, the monitoring MCU module sounds an alarm and detects the port, eliminates the abnormality of the PoE system module through a series of operations such as resetting, and displays the information of the port on the LCD screen if the abnormality is eliminated, or continuously operates an abnormality elimination instruction if the abnormality is not eliminated. If the port is not connected with the PD, the monitoring MCU module detects the power voltage of the port and the temperature of the control chip in real time.

After the underload, overload or short circuit of the port is eliminated, the monitoring MCU module starts to detect the switch system module. The switch system module detects in real time whether the broadband of each port has an abnormality, powers off and resets the PD of the corresponding port if the abnormality exists, detects whether the abnormality is eliminated after the resetting, continuously resets the PD if there is still the abnormality and detects the number of times of resetting. If the number does not exceed 10, the resetting is continued. If the number exceeds 10, the voltage of the port is directly cut off. If the broadband of each port does not have the abnormality, the monitoring MCU module accesses the switch system module through the bus, respectively acquires uploaded and downloaded data volumes of the port, calculates uploaded and downloaded data bandwidths of the port, and displays the bandwidths on the LCD screen.

Figures 5, 6:
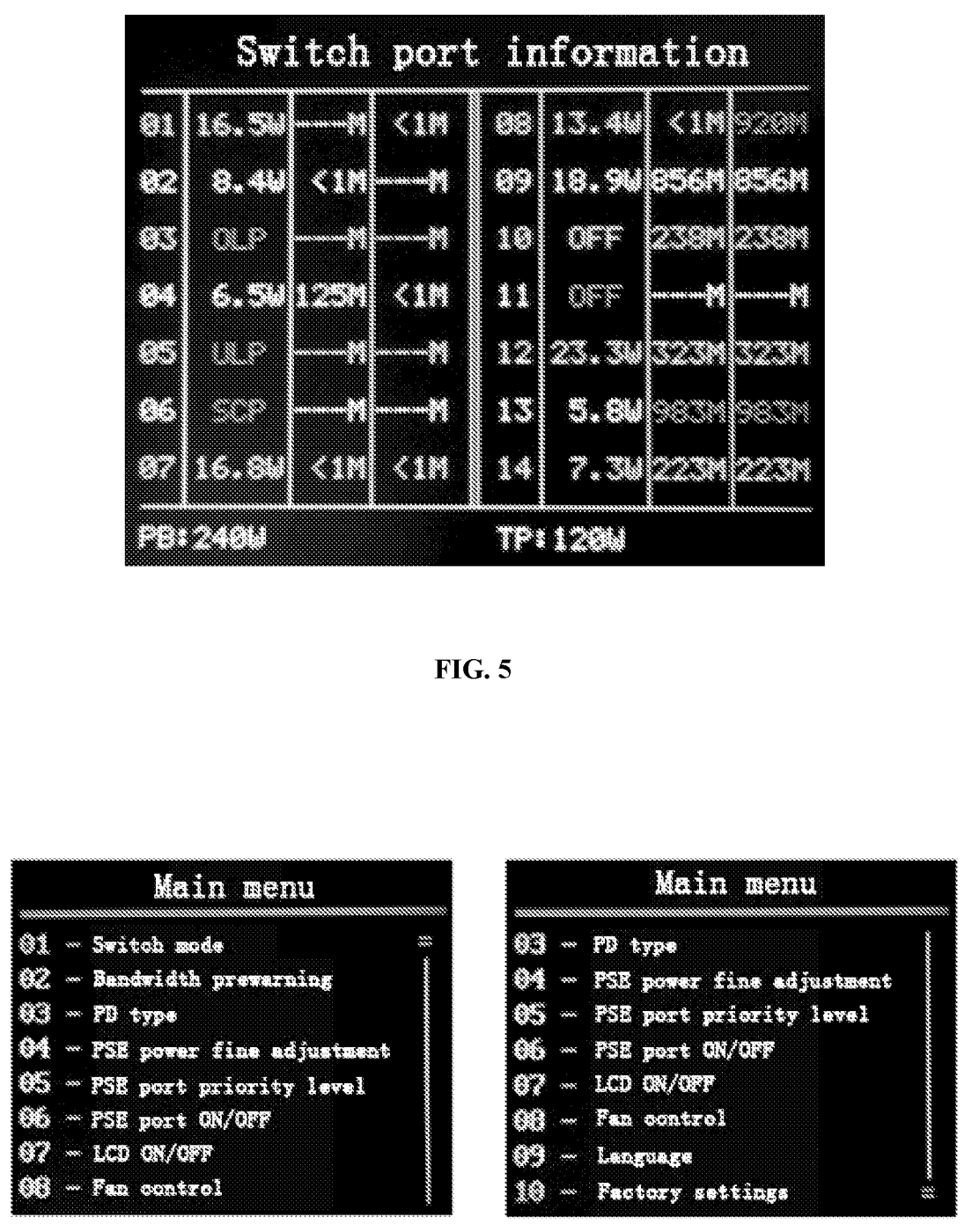

Embodiment I: referring to FIG. 5, contents displayed on the LCD when the PoE switch works normally.

The fifth column: the port number;

The sixth column: PoE information of the corresponding port;

16.5 W: It denotes the power being output by the port of the PoE switch;

OLP: It denotes that the port corresponding to the PSE has an overload, and is powered off;

ULP: It denotes that the port corresponding to the PSE has an underload, and is powered off; (*when a current on a network wire is less than 7.5 mA, the PSE considers that the PD has been unplugged, and the port is powered off)

SCP: It denotes that the port corresponding to the PSE has a short circuit, and is powered off;

OFF: The OFF in white and green denotes that the port is disabled through a menu command; the OFF in red denotes that a data rate of this port exceeds a set value, and appears for 10 times within 1 hour; in order to protect the normal work of the system, the port is powered off;

----W: It denotes that the port is not connected to PD equipment;

The third and seventh columns: data rates when corresponding ports enter the switch;

The fourth and eighth columns: data rates when corresponding ports leaves the switch;

---M: It denotes that this port does not have data transmission;

<1M: It denotes that the data transmission rate of this port is less than 1M;

856M: Characters in white and green denote rates when data are being transmitted; characters in red denote that the data transmission rate of this port is greater than a set bandwidth value of the switch, which may restart the power to this port by the PSE; if this phenomenon still exists after 10 times of restart within 1 hour, this port will be powered off;

PB: It denotes the maximum power supply power output by the PoE switch to the outside;

TP: It denotes the power supply power that has been output by the PoE switch through the port; (the value of TP is less than the value of PB).

Embodiment II: referring to FIG. 6, the content displayed in this figure is information displayed on the LCD screen when the menu key in the key group is pressed, and this is a main menu. A worker may carry out system setting, troubleshooting and maintenance on the PoE switch on this interface. Long press on an operation key: It refers to a press on the key for five seconds or longer; short press: It refers to a press on the key for not longer than three seconds. A long press on the menu key enables the LCD screen to display a menu. Different menu items are selected through the up key and the down key. After a short press on the confirm key, a corresponding menu item is opened. A short press on the back key will return to the previous menu till the menu is quit.

Figure 7:
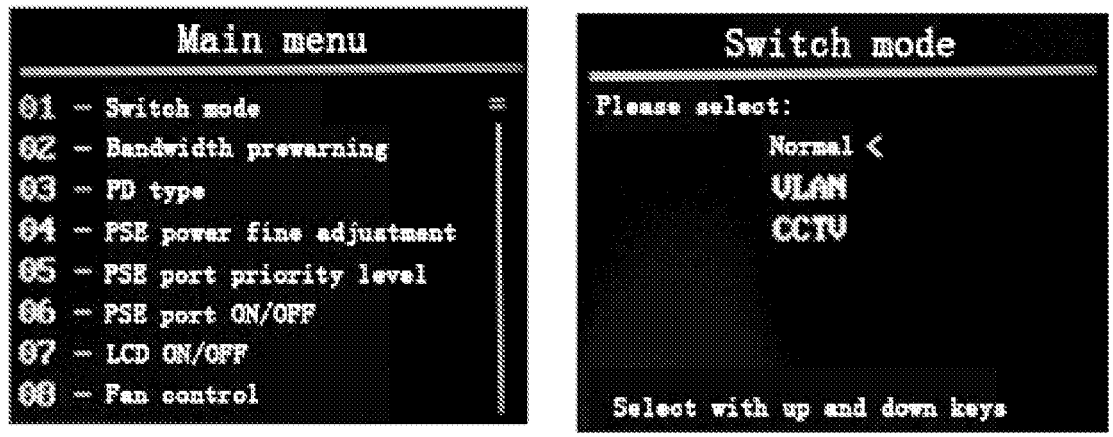
FIG. 7 is a show legend of a display screen of Embodiment III.

Embodiment III: referring to FIG. 7, in the main menu, "01—Switch mode" is selected through the up key and the down key; a submenu of the "01—Switch mode" is opened by pressing the confirm key; an item corresponding to the symbol "<" in the figure denotes settings of the current switch; different options are selected through the up key and the down key; after an option is clicked, the confirm key is pressed to select this option; and the symbol "<" moves to the right of this option. The back key is pressed to return to the main menu.

Figure 8:
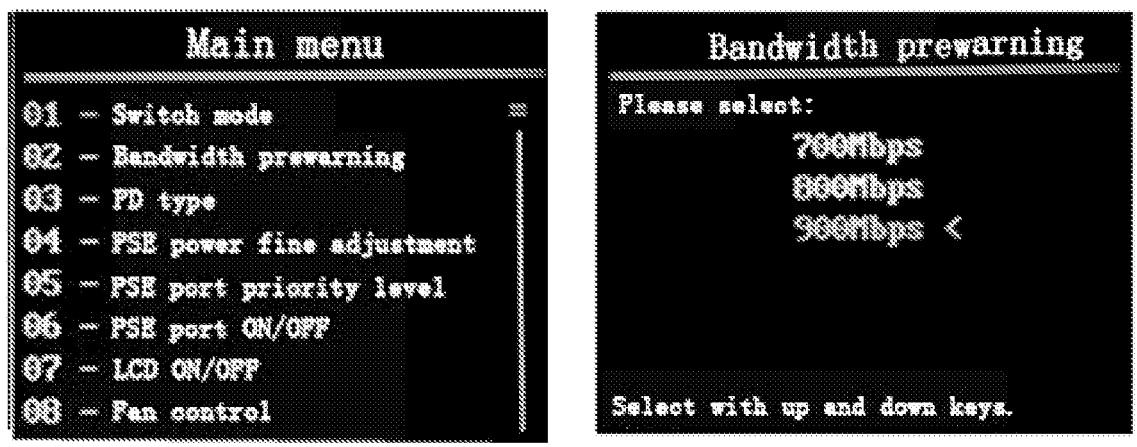
FIG. 8 is a show legend of a display screen of Embodiment IV.

Embodiment IV: referring to FIG. 8, in the main menu, "02—Bandwidth prewarning" is selected through the up key and the down key; a submenu of the "02—Bandwidth prewarning" is opened by pressing the confirm key; an item corresponding to the symbol "<" in the figure denotes settings of the current switch; different options are selected through the up key and the down key; after an option is clicked, the confirm key is pressed to select this option; and the symbol "<" moves to the right of this option. The back key is pressed to return to the main menu.

Figure 9:
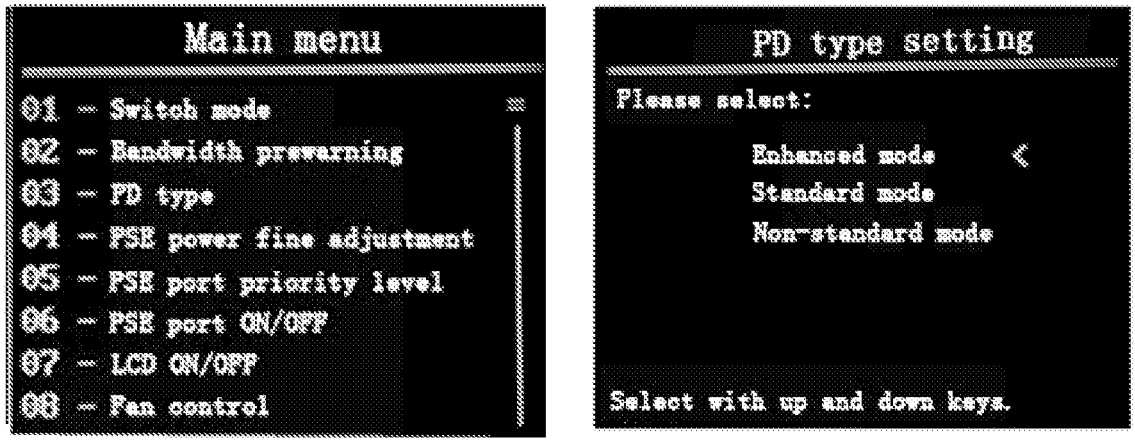
FIG. 9 is a show legend of a display screen of Embodiment V.

Embodiment V: referring to FIG. 9, in the main menu, "03—PD type" is selected through the up key and the down key; a submenu of the "03—PD type" is opened by pressing the confirm key; an item corresponding to the symbol "<" in the figure denotes settings of the current switch; different options are selected through the up key and the down key; after an option is clicked, the confirm key is pressed to select this option; and the symbol "<" moves to the right of this option. The back key is pressed to return to the main menu.

Figure 10:
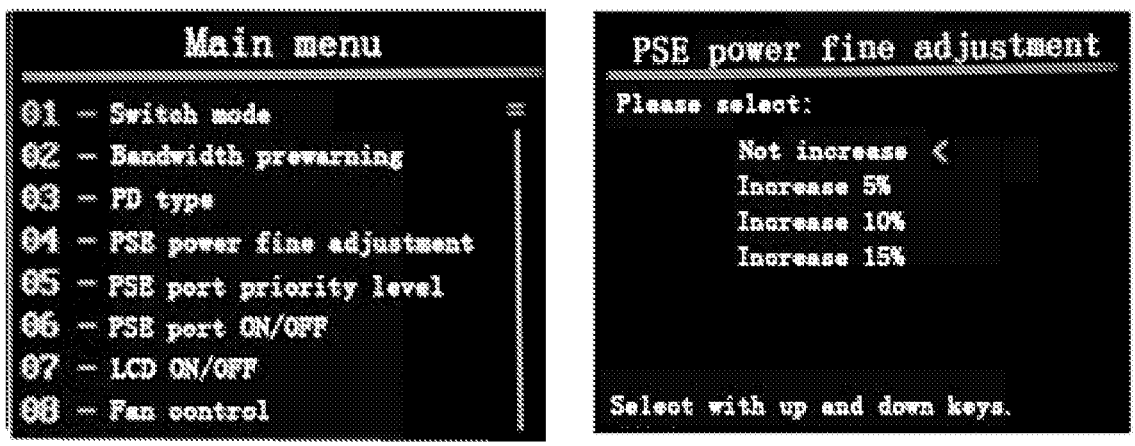
FIG. 10 is a show legend of a display screen of Embodiment VI.

Embodiment VI: referring to FIG. 10, when the surplus power of the PoE is too high due to a power distribution strategy of the PSE, much power may be distributed by ports as far as possible by increasing the power of the PSE, so as to increase the utilization rate of the power supply power of the PSE. In order to ensure that a power supply of the PSE is not used under a long-term overload, the value of TP is ensured to be less than the value of PB as far as possible.

In the main menu, "04—PSE power fine adjustment" is selected through the up key and the down key; a submenu of the "04—PSE power fine adjustment" is opened by pressing the confirm key; an item corresponding to the symbol "<" in the figure denotes settings of the current switch; different options are selected through the up key and the down key; after an option is clicked, the confirm key is pressed to select this option; and the symbol "<" moves to the right of this option. The back key is pressed to return to the main menu.

Figure 11:
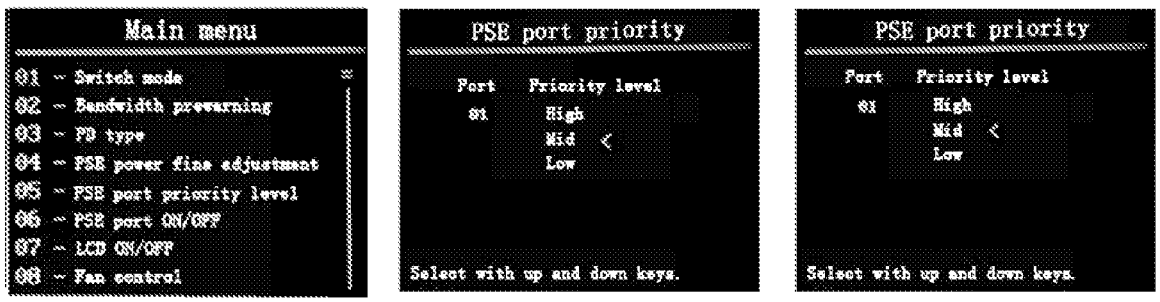
FIG. 11 is a show legend of a display screen of Embodiment VII.

Embodiment VII: referring to FIG. 11, in the main menu, "05—PSE port priority level" is selected through the up key and the down key; a submenu of the "05—PSE port priority level" is opened by pressing the confirm key; in the figure, the port number at this time is green, and may be changed through the up key and the down key; and meanwhile, the symbol "<" of the priority level column indicates a priority level of a corresponding port. After the port number is selected, the confirm key is pressed to make the port number turn into white at this time, and the option corresponding to the priority level column will turn into green. An item corresponding to the symbol "<" denotes settings of the current switch; different options are selected through the up key and the down key; after an option is clicked, the confirm key is pressed to select this option; and the symbol "<" moves to the right of this option. The back key is pressed to return to the main menu.

Figure 12:
FIG. 12 is a show legend of a display screen of Embodiment VIII.

Embodiment VIII: referring to FIG. 12, in the main menu, "06—PSE port ON/OFF" is selected through the up key and the down key; a submenu of the "06—PSE port ON/OFF" is opened by pressing the confirm key; in the figure, the port number at this time is green, and may be changed through the up and the down keys; and meanwhile, the symbol "<" of the state column indicates a state of a corresponding port. After the port number is selected, the confirm key is pressed to make the port number turn into white at this time, and the option corresponding to the state column will turn into green. An item corresponding to the symbol "<" denotes settings of the current switch; different options are selected through the up key and the down key; after an option is clicked, the confirm key is pressed to select this option; and the symbol "<" moves to the right of this option. The back key is pressed to return to the main menu.

Figure 13:
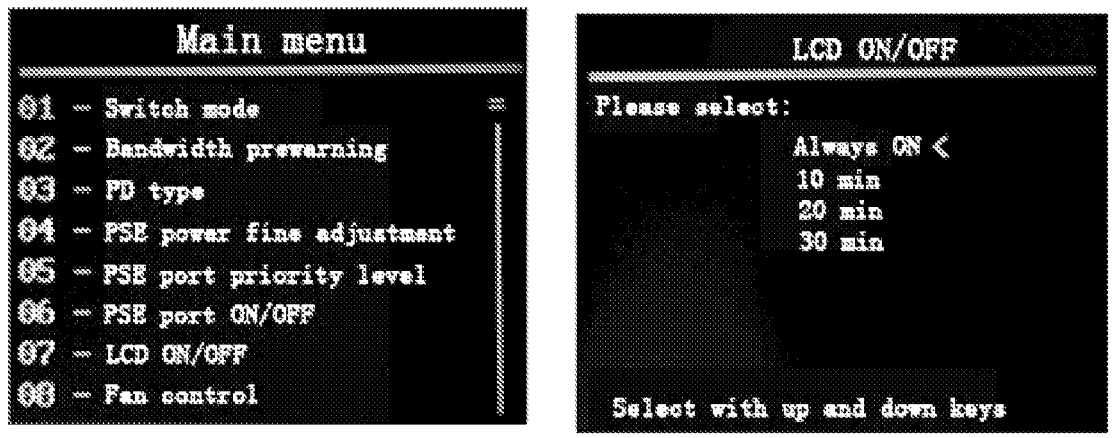
FIG. 13 is a show legend of a display screen of Embodiment IX.

Embodiment IX: referring to FIG. 13, in the main menu, "07—LCD ON/OFF" is selected through the up key and the down key; a submenu of the "07—LCD ON/OFF" is opened by pressing the confirm key; an item corresponding to the symbol "<" in the figure denotes settings of the current switch; different options are selected through the up key and the down key; after an option is clicked, the confirm key is pressed to select this option; and the symbol "<" moves to the right of this option. The back key is pressed to return to the main menu. After the LCD enters a sleep state, any key on the panel is pressed to make the LCD quit the sleep state.

Figure 14:
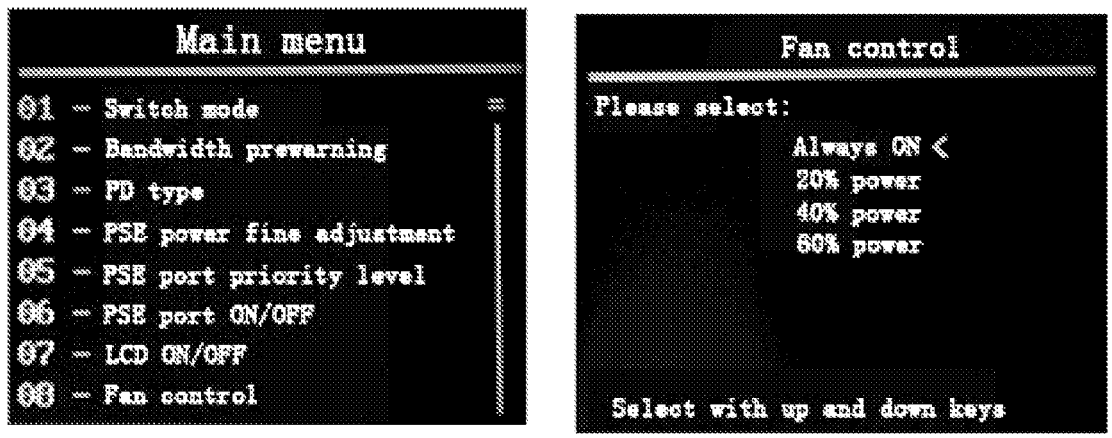
FIG. 14 is a show legend of a display screen of Embodiment X.

Embodiment X: referring to FIG. 14, in the main menu, "08—Fan control" is selected through the up key and the down key; a submenu of the "08—Fan control" is opened by pressing the confirm key; an item corresponding to the symbol "<" in the figure denotes settings of the current switch; different options are selected through the up key and the down key; after an option is clicked, the confirm key is pressed to select this option; and the symbol "<" moves to the right of this option. The back key is pressed to return to the main menu.

Figure 15:
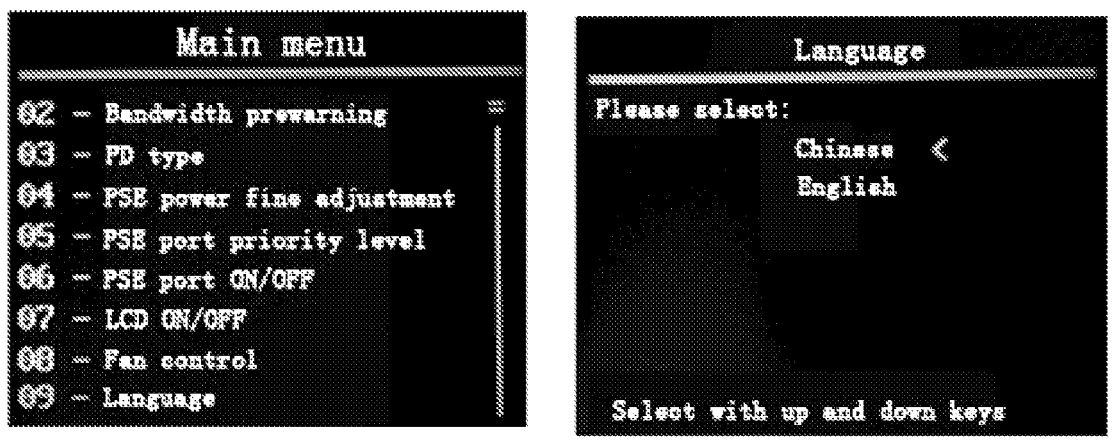
FIG. 15 is a show legend of a display screen of Embodiment XI.

Embodiment XI: referring to FIG. 15, in the main menu, "09—Language" is selected through the up key and the down key; a submenu of the "09—Language" is opened by pressing the confirm key; an item corresponding to the symbol "<" in the figure denotes settings of the current switch; different options are selected through the up key and the down key; after an option is clicked, the confirm key is pressed to select this option; and the menu changes to the selected language. The back key is pressed to return to the main menu.

Figure 16:
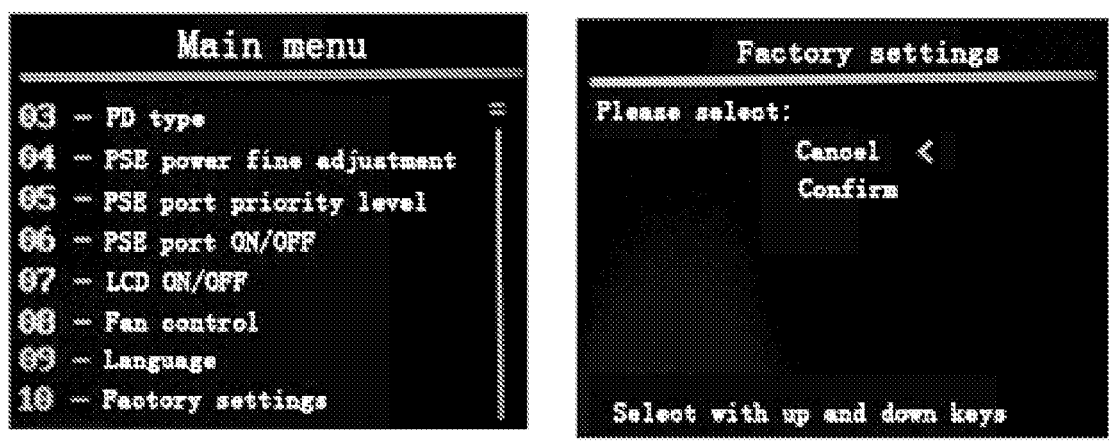
FIG. 16 is a show legend of a display screen of Embodiment XII.

Embodiment XII: referring to FIG. 16, in the main menu, "10—Factory settings" is selected through the up key and the down key; a submenu of the "10—Factory settings" is opened by pressing the confirm key; and different options are selected through the up key and the down key in the submenu. In the option "Cancel", if the confirm key is pressed, it will return to the main menu. In the option "Confirm", if the confirm key is pressed, the machine will restore the factory settings.

The preferred specific implementation modes or embodiments of the present disclosure are described in detail above with reference to the accompanying drawings, but the present disclosure is not limited to the above-mentioned implementation modes and embodiments. Various changes can further be made within the knowledge scope of those skilled in the art and without departing from the concept of the present disclosure.

What is claimed is:

1. An implementation method of a management system of a local management-based Power Over Ethernet (PoE) switch, the switch comprises a casing, a Liquid Crystal Display (LCD) screen, a monitoring Micro Control Unit (MCU) module, a power system module, a display module, a PoE system module and a switch system module, wherein the monitoring MCU module is connected with the display module, the PoE system module and the switch system module respectively through a bus; the monitoring MCU module monitors working states of the PoE system module and the switch system module in real time, and displays relevant information through the display module; the local management-based PoE switch further comprises a key group and a key module; the key group is arranged on the casing, and the monitoring MCU module is connected with the key module through the bus; the key module transmits information to the monitoring MCU module through the display module, and the monitoring MCU module performs corresponding operation according to received information, the implementation method comprising the following steps:

at step A, after the power system module supplies a power to all modules, enabling the monitoring MCU module to start to work, initializing all functional modules, and displaying information of a port;

at step B, detecting, by the monitoring MCU module, whether feedback information of the key module is received, and processing the feedback information when YES;

at step C, reading, by the monitoring MCU module, information of the PoE system module, acquiring a state of the port, initializing the PoE system module, simultaneously detecting a power voltage, a temperature of a control chip, and whether the port is connected with a PD, eliminating an abnormality through resetting when the power voltage and the temperature of the control chip have the abnormality, and commanding, by the monitoring MCU module, the display module to display the information of the port after the abnormality is eliminated;

at step D, detecting, by the monitoring MCU module, the switch system module, detecting whether a broadband of each port has the abnormality, eliminating the abnormality through resetting when the abnormality exists, or directly cutting off the power to the port when the abnormality is not eliminated; commanding, by the monitoring MCU module, the display module to display the information of the each port when no abnormality exists;

at step E, in a plurality of processes of the steps C and D, detecting in real time, by the monitoring MCU module, whether the feedback information of the key module is received, and correspondingly processing the feedback information.

2. The management system of the local management-based PoE switch according to claim 1, wherein information of the key module is fed back to the monitoring MCU module, wherein the monitoring MCU module comprises a switch mode, a bandwidth prewarning, a PD type, a Power Sourcing Equipment (PSE) power fine adjustment, a PSE port priority level, a PSE port ON/OFF, a LCD ON/OFF, and a fan control.

3. The management system of the local management-based PoE switch according to claim 1, wherein the information of the key module is selected and information data are confirmed through the key module, and the monitoring MCU module reads the information data through the bus and correspondingly processes the information data.

* * * * *